T. E. King.
Miter Box.
No. 112,355. Patented Mar. 7, 1871.

Witnesses,
Daniel C. Bates
W. J. Cambridge

Inventor,
Theodore E. King
per his attorneys
Tuchemacher & Stearns

T. E. King,
Miter Box.
No. 112,355. Patented Mar. 7, 1871.

Witnesses,
Daniel C. Bates
W. J. Cambridge

Inventor,
Theodore E. King
per his Attorneys
Fetchmacher & Stearns

UNITED STATES PATENT OFFICE.

THEODORE E. KING, OF BOSTON, MASSACHUSETTS.

IMPROVEMENT IN MITER-MACHINES.

Specification forming part of Letters Patent No. 112,355, dated March 7, 1871.

*To all whom it may concern:*

Be it known that I, THEODORE E. KING, of Boston, in the county of Suffolk and State of Massachusetts, have invented certain Improvements in Miter-Machines, of which the following is a full, clear, and exact description, reference being had to the accompanying drawing, making part of this specification, in which—

Figure 1:
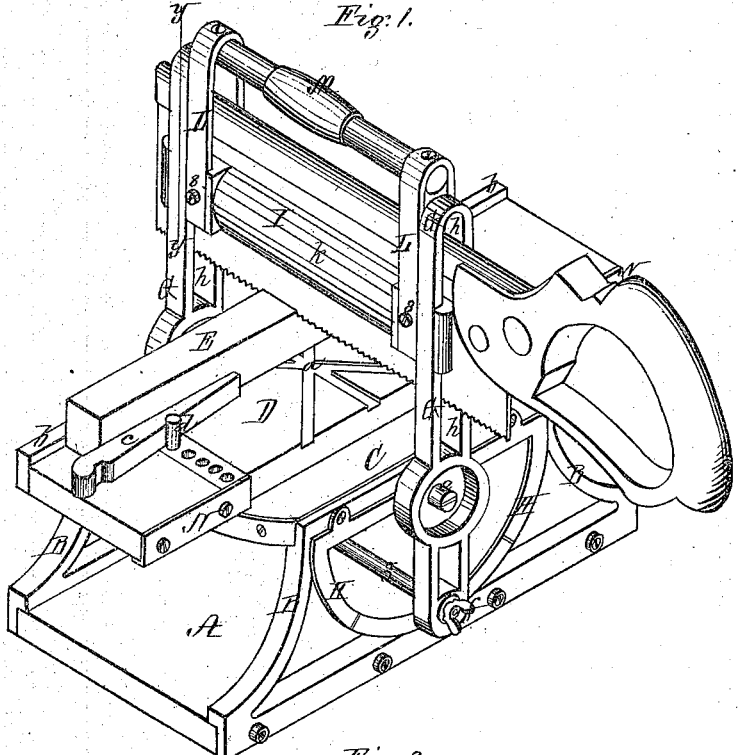
Figure 3:
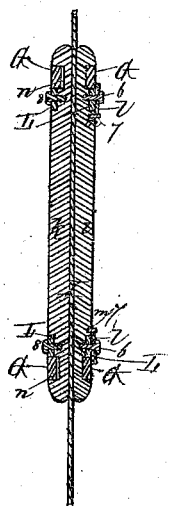
Figure 2:
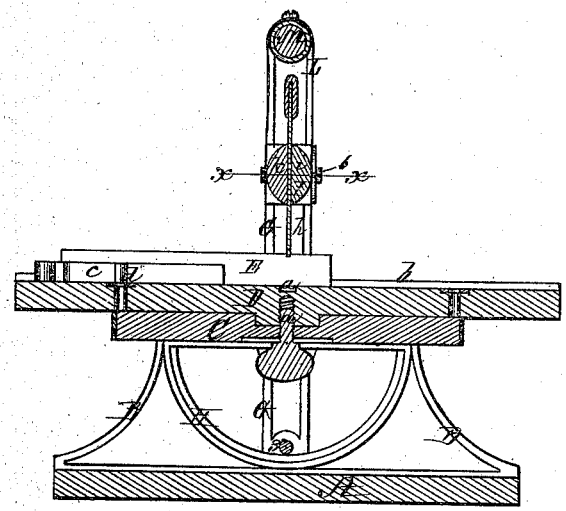
Figure 4:
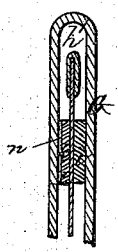
Figure 5:

Figure 1 is a perspective view of my improved mitering-machine. Fig. 2 is a longitudinal section through the center of the same. Fig. 3 is a transverse section on the line $xx$ of Fig. 2. Fig. 4 is a vertical section on the line $yy$ of Fig. 1; Fig. 5, detail, to be referred to.

In mitering-machines as heretofore constructed, where the blade of the saw is steadied and held between vertical guides placed on opposite sides of the table or bed on which the stock to be cut is laid, a small portion only of the saw is steadied by the guides, the central portion, or that which is directly over the work, being left unsupported, which renders it liable to spring, and thereby produce an irregular or inaccurate cut.

My invention has for its object to overcome this difficulty; and consists in a horizontal guide extending longitudinally along the blade of the saw, so as to form a continuous bearing for the central portion of the saw, or that directly over the work, by which means the blade is stiffened and a straight and accurate cut insured; and in connection with the above my invention also consists in one or more springs, which cause the guide to press with sufficient friction on the sides of the saw to hold it in place and prevent any lateral play, and at the same time admit of the use of saws of varying thicknesses.

My invention also consists in the said horizontal guide, with its spring or springs and supporting-frame, in combination with a table pivoted centrally, to admit of its being moved in a horizontal plane, to adjust the work to the saw to make the cut at the required angle.

To enable others skilled in the art to understand and use my invention, I will proceed to describe the manner in which I have carried it out.

In the said drawing, A is the base, from which rises the frame-work B, which supports the bed C, to the center $a$ of which is pivoted the table D, upon which is placed the piece E of wood or other material to be cut, the piece E being securely held in place against a ledge, $b$, by a wedge, $c$, and adjustable pin $d$, in a well-known manner. G is a frame pivoted at $e$ to each side of the frame-work, to admit of its being inclined at any desired angle, the lower end of each side of the frame being clamped against a graduated arc, H, by a screw-nut, $f$, on the end of a rod, $g$, the arc being provided with notches for the reception of a projection on the inside of the lower end of the frame G, to hold it securely when adjusted. The upper end of each side of the frame G is provided with a slot, $h$, and in these slots are placed the ends of two horizontal strips, $ik$, of hard wood, between which the blade of the saw is inserted, and which form a guide, I, therefor, the ends of the strips $ik$ being rounded off to facilitate the entrance of the saw.

The sides of the frame G fit into grooves in the ends of the strip $i$, which slides thereon, and is held in contact therewith by means of two plates, $ll$, Fig. 5, secured by screws 6 to the strip $i$, the outer edges, 7, of the plates $ll$ being turned in, so as to form projections $mm$, which bear on the outside of the frame, to create sufficient friction to hold the strip in any position in which it may be adjusted.

The ends of the strip $k$ are provided with grooves $nn$, and slide on the side of the frame opposite to that on which the strip $i$ slides. The strip $k$ is supported and held in place by looped springs L L, secured thereto at 8, the opposite ends of the springs being secured by the screws 6 to the strip $i$. These springs serve to force the strip $k$ against the strip $i$, and yield when the saw is inserted between the strips, the looped or bent form of the springs allowing the saw to be freely operated, while at the same time saws of various thicknesses may be used without having any lateral play.

It will be seen that the above-described guide I extends longitudinally along the blade of the saw and forms a continuous bearing for the portion of the saw directly over the work, and a straight and accurate cut may thus be made, as desired.

The strips *i k*, forming the saw-guide I, together with the springs, are made to slide up and down within the frame G, a rod or handle, M, being secured to the upper ends of the springs to facilitate this operation. The guide may be thus adjusted to the work, so as to support and stiffen the saw in close proximity thereto, whereby the lateral vibration of the blade and the consequent irregularity of the cut is prevented.

Where a stiff-back saw is employed, the sliding guide I may be used as a gage for regulating the depth of the cut.

The ends of the bed C are arcs of a circle, the center of which is the point *a*, where the table D is pivoted thereto. These arcs may be graduated, and are provided with notches to receive the lower projecting edges of the plates N, secured to the opposite ends of the table, by which the latter, with the stock thereon, is held to the required horizontal angle when adjusted, the pivoted frame G allowing the saw to be inclined at any desired angle to the vertical.

Instead of two looped springs, L L, one at each end of the guide, a single spring of sufficient width may be substituted therefor.

Claims.

What I claim as my invention, and desire to secure by Letters Patent, is—

1. The horizontal guide I, extending longitudinally along the blade of the saw, substantially as and for the purpose set forth.

2. One or more looped springs, L, in combination with the guide I, substantially as and for the purpose set forth.

3. The combination of the horizontal guide I, one or more springs, L, and the guide-frame G with the centrally-pivoted table D, operating substantially in the manner and for the purpose described.

Witness my hand this 21st day of January, A. D. 1871.

THEODORE E. KING.

Witnesses:
P. E. TESCHEMACHER,
N. W. STEARNS.